(No Model.) 2 Sheets—Sheet 1.

J. N. KAILOR.
CLOVER HULLING MACHINE.

No. 472,218. Patented Apr. 5, 1892.

WITNESSES:
A. M. Hood.
S. K. Hood.

INVENTOR
John N. Kailor,
BY H. P. Hood,
ATTORNEY.

(No Model.)  
2 Sheets—Sheet 2.

J. N. KAILOR.
CLOVER HULLING MACHINE.

No. 472,218.  
Patented Apr. 5, 1892.

WITNESSES:  
A. M. Hood.  
E. K. Hood.

INVENTOR:  
John N. Kailor  
BY H. P. Hood,  
ATTORNEY.

UNITED STATES PATENT OFFICE.

JOHN N. KAILOR, OF COLUMBUS, INDIANA, ASSIGNOR TO REEVES & CO., OF SAME PLACE.

CLOVER-HULLING MACHINE.

SPECIFICATION forming part of Letters Patent No. 472,218, dated April 5, 1892.

Application filed October 29, 1891. Serial No. 410,178. (No model.)

*To all whom it may concern:*

Be it known that I, JOHN N. KAILOR, a citizen of the United States, residing at Columbus, in the county of Bartholomew and State of Indiana, have invented a new and useful Improvement in Clover-Hulling Machines, of which the following is a specification.

My invention relates to an improvement in clover-hulling machines of that class in which two operating-cylinders are used.

The object of my improvement is to provide, in connection with an open or grated concave arranged to hold the material against the upper cylinder and an adjustable concave having teeth arranged to co-operate to a greater or less extent with the teeth of the upper cylinder and so constructed and arranged that the seed-pods and seed which are separated from the stalks by the upper cylinder may pass directly through said open concave and said adjustable toothed concave directly to the lower or hulling cylinder without again being mixed with the separated stalks and chaff, improved means for adjusting the toothed concave, all as hereinafter fully set forth.

The accompanying drawings illustrate my invention.

Figure 1:
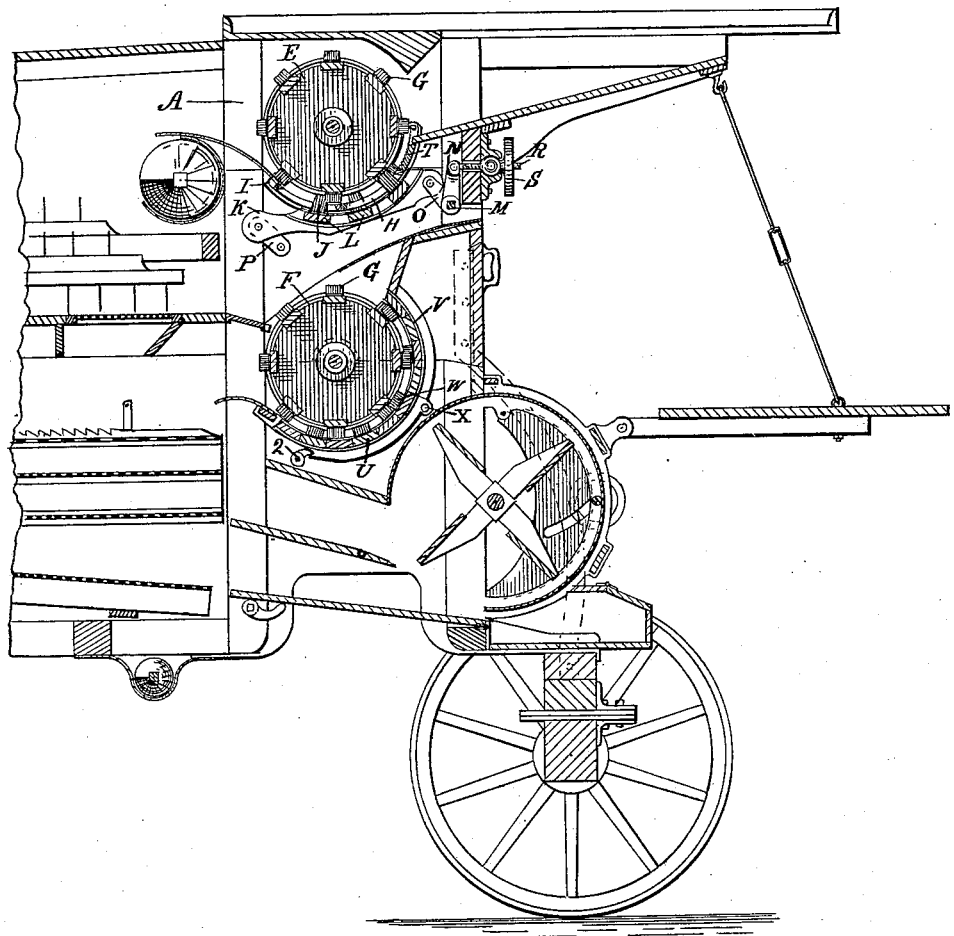
Figure 2:
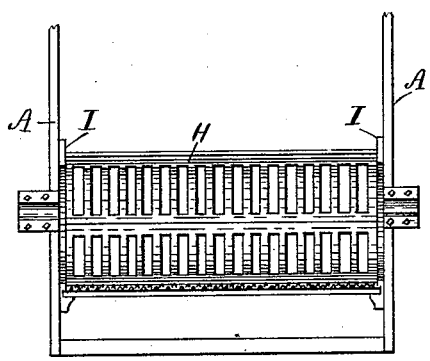
Figure 3:
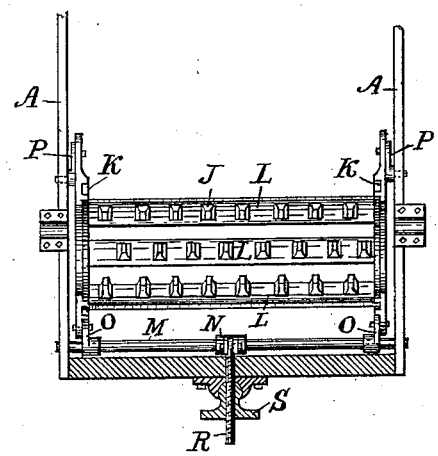

Figure 1 represents a vertical longitudinal section of the front part of the clover-huller, showing the arrangement of the hulling-cylinders and the parts connected therewith. Fig. 2 is a plan of the concave grating, which is adapted to inclose a part of the upper cylinder. Fig. 3 is a plan of the adjustable toothed concave, which co-operates with the upper cylinder and its grating.

In the drawings, A represents the case or frame in which the hulling mechanism is mounted.

E is the upper cylinder, and F the lower cylinder. Both of these cylinders are of the usual well-known construction, termed "open cylinders," and are each provided with several series of teeth G, having corrugated surfaces, in the usual well-known manner. The cylinders are arranged one directly above the other. Arranged beneath the upper cylinder and concentric therewith is the curved open grating H, which is adapted to hold the material to be operated upon in the path of teeth of the upper cylinder and to permit the passage through its openings of the separated clover heads and seeds. Said grating is constructed, preferably, of two or more segments, mounted at each end in grooved cleats I I, secured to the inner side of the main frame or casing.

Mounted beneath grating H, so as to be vertically adjustable relatively thereto, is an open frame or concave in which the rubbing-teeth J are mounted. Said frame consists of a pair of end pieces K K, connected by a series of bars L L, placed at short distances apart, so as to leave open spaces between them and secured at each end to the end pieces. The teeth J, having roughened sides in the usual well-known manner, are arranged in bars L, so as to project through the openings in the grating H and allow the teeth G of the cylinder to pass between them as the cylinder revolves, and the frame in which they are mounted is adjustably secured to the main frame, so that the teeth therein may be projected to a greater or less degree through the concave grating H or be entirely withdrawn therefrom at the will of the operator by the following mechanism: A rock-shaft M is mounted in suitable bearings on the main frame and is provided with an arm N, secured thereto near its center and at opposite ends with a pair of arms O O, also rigidly secured thereto. The end pieces K K of the frame-carrying teeth J are pivoted at one end to the arms O and are supported at the other end by the links P P, which are pivoted at one end to the casing and at the other end to the pieces K, the arrangement being such that as the rock-shaft M is oscillated the concave frame supporting teeth J is thrown toward or from cylinder E with a substantially parallel movement, and the teeth J are projected to a greater or less extent through the concave grating H, thus affording a greater or less resistance to the passage of the material operated upon, according to its condition. Rock-shaft M is oscillated and adjustably secured in position by means of a screw-threaded bar R, pivoted at one end to arm N and passing through a hand-nut S, mounted on the front of the casing.

It will be observed that the relation of arms O and links P to each other and to the tooth-frame which they support is such that both edges of the frame are raised and lowered simultaneously and to the same degree, so that all of the teeth J are equally projected through the grating H at any point of their vertical adjustment. This is a point of considerable importance, which, I believe, has not been before attained.

The concave for the lower cylinder is formed in two parts U and V, and consists of a series of segments placed close together and provided with the rubbing-teeth W, the section U being pivoted at $x$ to the main casing and having its rear edge vertically adjustable by means of the rock-shaft 2, in a manner well known in this class of machines.

In operation the toothed concave carrying the teeth J is adjusted, as before described, so as to project the teeth to a greater or less extent through the grating H, according to the condition of the material to be operated upon. The clover being fed to the upper cylinder, a large portion of the clover-heads are separated from the stalks and some of the seeds are dislodged. Both seeds and heads pass through the grating H and between the bars L of the toothed concave and fall directly into the lower cylinder, where the separation of the seeds is completed.

That portion of the machine back of the thrashing-cylinders is provided with the usual well-known separating mechanism, which need not be here further described.

I claim as my invention—

In a clover-huller, the combination, with the main frame or casing, the stemming or hulling cylinder, the open concave grating arranged beneath said cylinder, and the toothed frame arranged beneath said grating, of the rock-shaft mounted in bearings in said casing and having a pair of arms which are pivoted to opposite ends of said toothed frame so as to support one edge thereof, the pair of links pivoted, respectively, to the opposite sides of the casing at one end and at the other end pivoted to the ends of said toothed frame, and means for adjustably securing the rock-shaft in position, whereby the teeth of the toothed frame are vertically adjusted simultaneously and equally relatively to the cylinder, as set forth.

JOHN N. KAILOR.

Witnesses:
B. M. HUTCHINS,
H. P. HOOD.